(12) United States Patent
Zheng et al.

(10) Patent No.: US 11,431,641 B2
(45) Date of Patent: Aug. 30, 2022

(54) RATE ADAPTATION IN WIRELESS LOCAL AREA NETWORKS (WLANS)

(71) Applicant: NXP USA, Inc., Austin, TX (US)

(72) Inventors: Xiayu Zheng, San Jose, CA (US); Yan Zhang, Palo Alto, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 626 days.

(21) Appl. No.: 16/049,739

(22) Filed: Jul. 30, 2018

(65) Prior Publication Data

US 2019/0306070 A1 Oct. 3, 2019

Related U.S. Application Data

(60) Provisional application No. 62/650,179, filed on Mar. 29, 2018.

(51) Int. Cl.
| | |
|---|---|
| *H04L 47/25* | (2022.01) |
| *H04L 1/00* | (2006.01) |
| *H04L 1/20* | (2006.01) |
| *H04W 84/12* | (2009.01) |
| *H04L 43/0823* | (2022.01) |

(52) U.S. Cl.
CPC .......... *H04L 47/25* (2013.01); *H04L 1/0002* (2013.01); *H04L 1/0007* (2013.01); *H04L 1/0009* (2013.01); *H04L 1/0016* (2013.01); *H04L 1/20* (2013.01); *H04L 43/0823* (2013.01); *H04W 84/12* (2013.01)

(58) Field of Classification Search
None
See application file for complete search history.

(56) References Cited

U.S. PATENT DOCUMENTS

2010/0183087 A1* 7/2010 Hosokawa ........... H04B 7/0848
375/262

FOREIGN PATENT DOCUMENTS

WO WO-2013/151716 A1 10/2013

OTHER PUBLICATIONS

Invitation to Pay Additional Fees and Partial International Search Report in International Patent Application No. PCT/US2018/044403, dated Jan. 3, 2019 (16 pages).

(Continued)

*Primary Examiner* — Noel R Beharry
*Assistant Examiner* — Liem H. Nguyen

(57) ABSTRACT

A communication device stores a master rate table, which comprises a plurality of rows that correspond to i) respective data rates, and ii) respective sets of communication parameter values corresponding to the respective sets of data rates. Each set of communication parameter values includes i) a default value of a parameter, and iii) one or more alternative values of the parameter. When the communication device determines that a new transmission rate should be used, and when a current set of communication parameter values corresponds to a row in the master rate table and includes the default value, the communication device selects a trial set of communication parameter values corresponding to the row of the master rate table, and including one of the alternative values. The communication device measures an error rate measure corresponding to use of the trial set of communication parameter values.

20 Claims, 6 Drawing Sheets

(56) References Cited

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

* cited by examiner

FIG. 3

| Rate | BW | HE-LTF+GI | $N_{SS}$ | MCS | Max PE | DCM/ER | HE-LTF+GI for trials |
|---|---|---|---|---|---|---|---|
| Rate 0 | ... | 4x HE-LTF+GI4 | ... | ... | ... | ... | $R_0$ = <1x HE-LTF+GI1, 2x HE-LTF+GI2> |
| Rate 1 | ... | 4x HE-LTF+GI4 | ... | ... | ... | ... | $R_1$ = <1x HE-LTF+GI1, 2x HE-LTF+GI2> |
| Rate 2 | ... | 4x HE-LTF+GI4 | ... | ... | ... | ... | $R_2$ = <1x HE-LTF+GI1, 2x HE-LTF+GI2> |
| ... | | ... | | | | | ... |
| Rate k | ... | 4x HE-LTF+GI4 | ... | ... | ... | ... | $R_k$ = <1x HE-LTF+GI1, 2x HE-LTF+GI2> |
| Rate k+1 | ... | 4x HE-LTF+GI4 | ... | ... | ... | ... | $R_{k+1}$ = <1x HE-LTF+GI1, 2x HE-LTF+GI2> |
| ... | | ... | | | | | ... |
| Rate K | ... | 4x HE-LTF+GI4 | ... | ... | ... | ... | $R_K$ = <1x HE-LTF+GI1, 2x HE-LTF+GI2> |

GI1 = 0.8 μs, GI2 = 1.6 μs, GI4 = 3.2 μs

RATE ADAPTATION IN WIRELESS LOCAL AREA NETWORKS (WLANS)

CROSS REFERENCES TO RELATED APPLICATIONS

This application claims the benefit of U.S. Provisional Patent App. No. 62/650,179, entitled "Rate Adaptation," filed on Mar. 29, 2018, the disclosure of which is hereby expressly incorporated herein by reference in its entirety.

FIELD OF TECHNOLOGY

The present disclosure relates generally to wireless communication systems, and more particularly to setting data transmission rates in wireless communication networks.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

<In an embodiment, a method includes: storing, in a memory device of a first communication device, a master rate table, wherein the master rate table comprises a plurality of rows that correspond to i) respective data rates, and ii) respective sets of communication parameter values corresponding to the respective sets of data rates, each set of communication parameter values includes i) a respective plurality of first values corresponding to a plurality of first parameters, ii) respective one or more default second values corresponding to one or more second parameters, and iii) respective one or more alternative second values corresponding to the one or more second parameters. The method also includes: determining, at the first communication device, a first error rate measure corresponding to transmission of one or more first data units by the first communication device to a second communication device according to a first set of communication parameter values, wherein the first set of communication parameter values correspond to i) a first row of the master rate table, and ii) a first transmission data rate; and when the first communication device determines that a new transmission rate should be used, selecting, at the first communication device, new communication parameter values using the master rate table, including: when the first set of communication parameter values includes the respective one or more default second values corresponding to the first row of the master rate table, determining, at the first communication device, a first trial set of communication parameter values as i) the respective plurality of first values corresponding to the first row of the master rate table, and ii) at least one of the respective one or more alternative second values corresponding to the one or more second parameters that correspond to the first row of the master rate table, determining, at the first communication device, a second error rate measure corresponding to transmission of one or more second data units by the first communication device to the second communication device according to the first trial set of communication parameter values, and selecting, at the first communication device, the new communication parameter values based on the second error rate measure.

In another embodiment, an apparatus comprises: a network interface device associated with a first communication device. The network interface device comprises: one or more integrated circuit (IC) devices, and a memory device implemented on the one or more IC devices. The one or more IC devices are configured to: store, in the memory device, a master rate table, wherein: the master rate table comprises a plurality of rows that correspond to i) respective data rates, and ii) respective sets of communication parameter values corresponding to the respective sets of data rates, and each set of communication parameter values includes i) a respective plurality of first values corresponding to a plurality of first parameters, ii) respective one or more default second values corresponding to one or more second parameters, and iii) respective one or more alternative second values corresponding to the one or more second parameters. The one or more IC devices are further configured to: determine a first error rate measure corresponding to transmission of one or more first physical layer (PHY) data units to a second communication device according to a first set of communication parameter values, wherein the first set of communication parameter values correspond to i) a first row of the master rate table, and ii) a first transmission data rate, when the network interface device determines that a new transmission rate should be used, select new communication parameter values using the master rate table, including: when the first set of communication parameter values includes the respective one or more default second values corresponding to the first row of the master rate table, determining a first trial set of communication parameter values as i) the respective plurality of first values corresponding to the first row of the master rate table, and ii) at least one of the respective one or more alternative second values corresponding to the one or more second parameters that correspond to the first row of the master rate table, determining a second error rate measure corresponding to transmission of one or more second data units by the first communication device to the second communication device according to the first trial set of communication parameter values, and selecting the new communication parameter values based on the second error rate measure.

In yet another embodiment, a method includes: generating, at a communication device, one or more first physical layer (PHY) data units using a first set of communication parameter values, wherein the first set of communication parameter values corresponds to a first data rate; transmitting, by the communication device, the one or more first PHY data units; determining, at the first communication device, that a new data rate is to be used based on error rate information corresponding to the transmission of the one or more first PHY data units; in response to determining that the new data rate is to be used: determining, at the communication device, a plurality of trial sets of communication parameters corresponding to respective second data rates, generating, at the communication device, respective sets of one or more second PHY data units using the plurality of trial sets of communication parameter values, transmitting, by the communication device, the respective sets of one or more second PHY data units during a first contiguous time period for evaluating the plurality of trial sets of communication parameter values, and selecting, at the communication device, a new set of communication parameter values based on error rate information corresponding to the transmission of the respective sets of one or more second PHY data units during the first contiguous time period. The method further includes: transmitting, by the communication device, one or more third PHY data units using the new set of communication parameter values during a second contiguous time period after the first contiguous time period.

In still another embodiment, an apparatus comprises: a network interface device including one or more integrated circuit (IC) devices, wherein the one or more IC devices are configured to: generate one or more first physical layer (PHY) data units using a first set of communication parameter values, wherein the first set of communication parameter values corresponds to a first data rate, transmit the one or more first PHY data units, determine that a new data rate is to be used based on error rate information corresponding to the transmission of the one or more first PHY data units, and in response to determining that the new data rate is to be used: determine a plurality of trial sets of communication parameters corresponding to respective second data rates, generate respective sets of one or more second PHY data units using the plurality of trial sets of communication parameter values, transmit the respective sets of one or more second PHY data units during a first contiguous time period for evaluating the plurality of trial sets of communication parameter values, and select a new set of communication parameter values based on error rate information corresponding to the transmission of the respective sets of one or more second PHY data units during the first contiguous time period; wherein the one or more IC devices are configured to: transmit one or more third PHY data units using the new set of communication parameter values during a second contiguous time period after the first contiguous time period.

BRIEF DESCRIPTION OF THE DRAWINGS

FIG. 3 is a diagram of an example master rate table, according to an embodiment.

DETAILED DESCRIPTION

Rate adaptation techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, rate adaptation techniques are utilized in other types of wireless communication systems such as personal area networks (PANs), mobile communication networks such as cellular networks, metropolitan area networks (MANs), satellite communication networks, etc.

Figure 1:
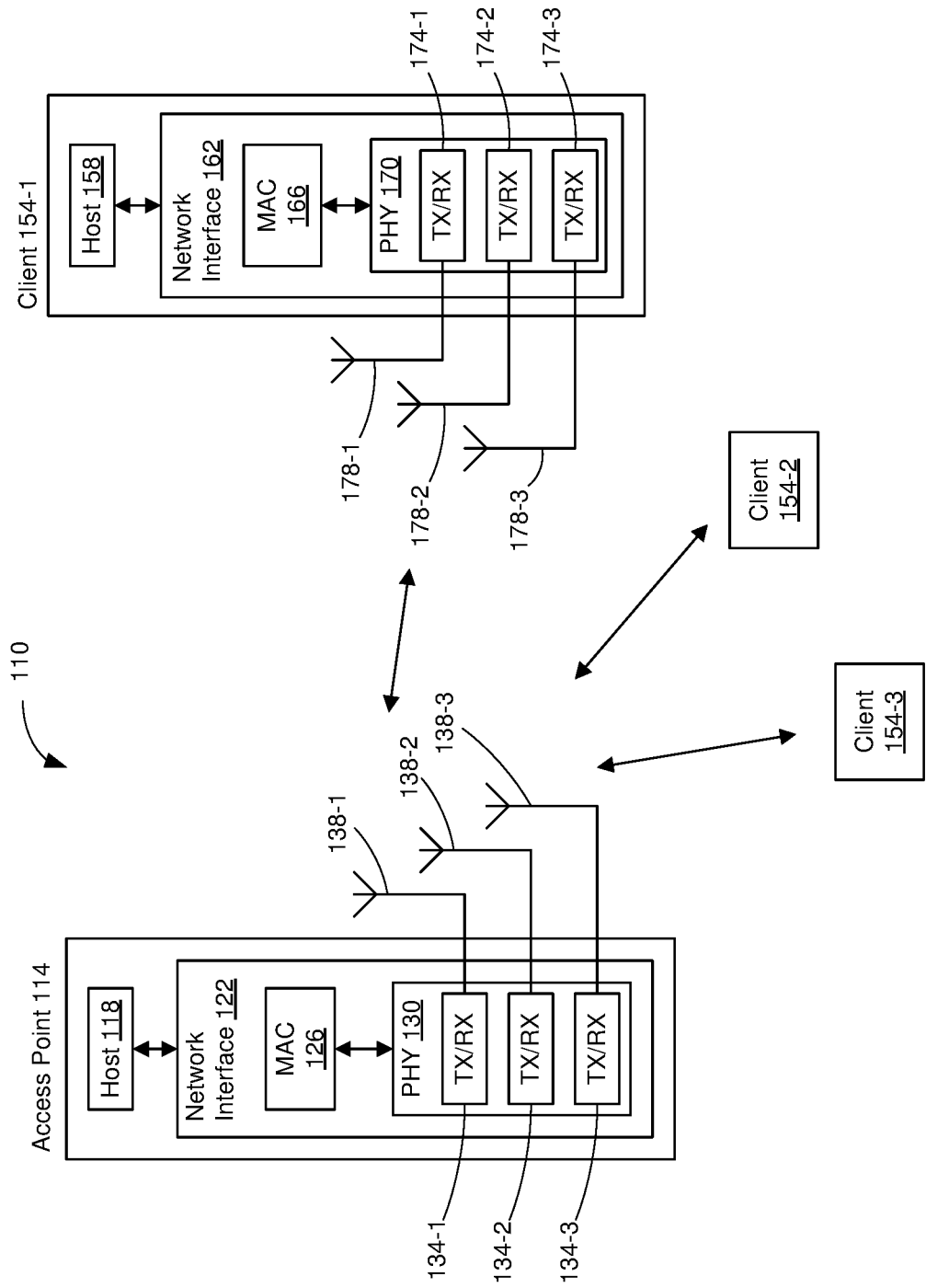
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
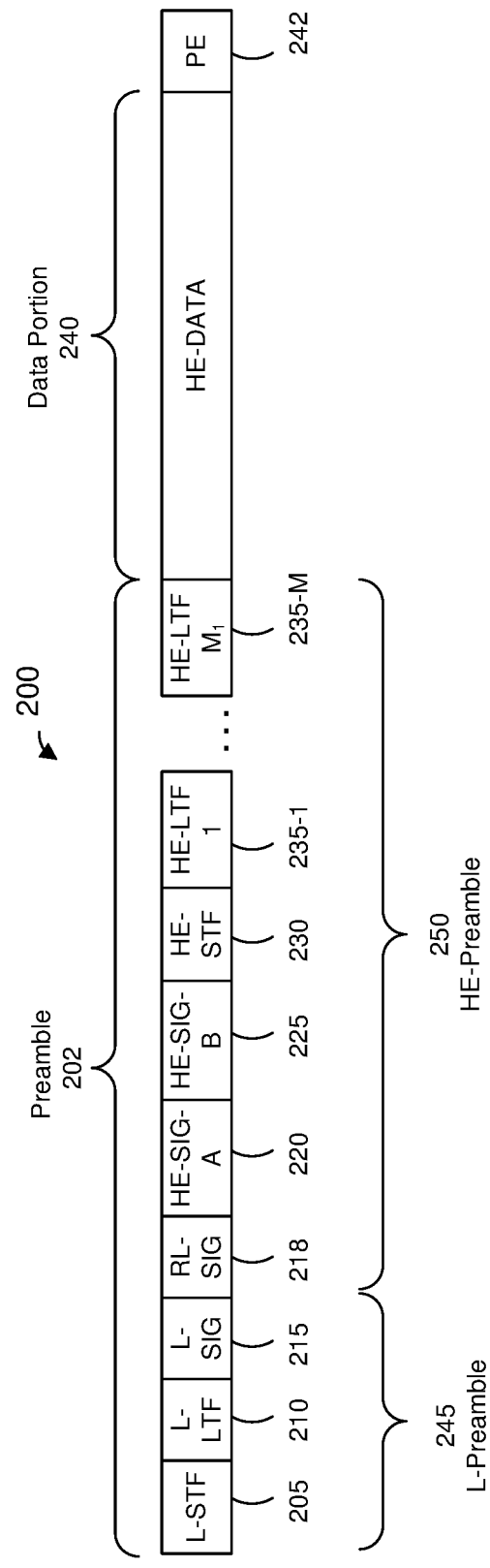
FIG. 2 is a block diagram of an example physical layer (PHY) data unit, according to an embodiment.

FIG. 2 is a diagram of a physical layer (PHY) data unit 200 that the network interface 122 (FIG. 1) is configured to generate and transmit to one or more client stations 154, according to an embodiment. The network interface 162 (FIG. 1) may also be configured to transmit data units the same as or similar to the data unit 200 to the AP 114. The data unit 200 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, for example, or other suitable bandwidths, in other embodiments.

The data unit 200 includes a preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal-A field (HE-SIG-A) 220, an HE signal-B field (HE-SIG-B) 225, an HE short training field (HE-STF) 230, and M HE long training fields (HE-LTFs) 235-M, where M is a suitable positive integer. In an embodiment, M generally corresponds to (e.g., is greater than or equal to) a number of spatial streams via which the data unit 200 will be transmitted. A legacy preamble portion 245 of the preamble 202 includes the L-STF 205, L-LTF 210 and L-SIG 215. An HE preamble portion 250 of the preamble 202 includes the RL-SIG 218, the HE-SIG-A 220, the HE-SIG-B 225, the HE-STF 230 and the M HE-LTFs 235. The data unit 200 also includes a data portion 240 and a packet extension (PE) field 242. In some scenarios, the data unit 200 may omit the data portion 240. In some embodiments, the data unit 200 may omit one or more fields corresponding to the preamble 202. In some embodiments, the preamble 202 includes additional fields not illustrated in FIG. 2.

Each of the L-STF 205, the L-LTF 210, the L-SIG 215, the RL-SIG 218, the HE-SIG-A 220, the HE-SIG-B 225, the HE-STF 230, and the M HE-LTFs 235 comprises one or more orthogonal frequency division multiplexing (OFDM) symbols. As merely an illustrative example, the HE-SIG-A 220 comprises two OFDM symbols.

In the illustration of FIG. 2, the data unit 200 includes one of each of the L-STF 205, the L-LTF 210, the L-SIG 215, the RL-SIG 218 and the HE-SIG-A 220. In some embodiments in which a data unit similar to the data unit 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the data unit, in an embodiment. For example, in an embodiment in which the data unit occupies an 80 MHz bandwidth, the data unit 200 includes four of each of the L-STF 205, the L-LTF 210, the L-SIG 215, the RL-SIG 218, and the HE-SIG-A 220.

In an embodiment, the HE-SIG-A 220 generally carries information about the format of the data unit 200, such as information needed to properly decode at least a portion of the data unit 200, in an embodiment. In some embodiments, HE-SIG-A 220 additionally includes information for receivers that are not intended receivers of the data unit 200, such as information needed for medium protection, spatial reuse, etc. In an embodiment where the data unit 200 is a single user (SU) data unit transmitted to/from a single client station, the data unit 200 does not include an HE-SIG-B field 225.

In an embodiment, the data unit 200 is a multi-user (MU) orthogonal frequency division multiple access (OFDMA) data unit in which independent data streams are transmitted to/from multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to transmissions to one or more client stations 154. In an embodiment, the independent data streams in respective allocated RUs are further transmitted using respective spatial streams, allocated to the client stations 154, using multiple-input multiple-output (MIMO) techniques. In an embodiment, the data unit 200 is an MU-MIMO data unit in which independent data streams are transmitted to/from multiple client stations 154 using respective spatial streams, allocated to the client stations 154.

In an embodiment, the HE-SIG-B 225 is present when the data unit 200 is an MU data unit (e.g. OFDMA data unit, MU-MIMO data unit). In an embodiment, the HE-SIGB 224 indicates RU and/or spatial stream allocation configuration for multiple client stations 154.

The PE field 242 is optionally appended to the end of the data unit 200 to provide a receiver device with additional processing time at the end of reception of the data unit 200.

A communication device (e.g., an AP 114, a client station 154, the network interface 122, the network interface 162, etc.) transmits a PHY data unit (e.g., the PHY data unit 200 or another PHY data unit) using communication parameters pertaining to, e.g., encoding, modulation, packet format, transmission, etc., of the PHY data unit. For instance, in an embodiment, the communication device determines communication parameters to be used based on one or more of established criteria of a particular communication protocol, characteristics of a channel between a transmitter and a receiver, device capabilities of the transmitter and/or the receiver, type of data to be transmitted, etc.

In an embodiment, the determined communication parameters correspond to a selection of one or more of a modulation and coding scheme (MCS), a bandwidth, an HE-LTF size, a guard interval (GI) duration, a number of spatial streams ($N_{SS}$), a maximum PE duration, etc. In an embodiment, the communication device also determines whether dual carrier modulation (DCM) and/or an extended range (ER) format is to be used for the data unit.

The MCS corresponds to a modulation scheme and a coding rate (e.g., a ratio of data bits to corresponding coded bits (e.g., ½, ⅔, ¾, etc.)), to be used to generate at least a portion of the data unit 200. The BW corresponds to a bandwidth to be used (e.g., 20 MHz, 40 MHz, 80 MHz, etc.) for transmission of the data unit 200.

The HE-LTF size corresponds to a duration of each HE-LTF 235. In an embodiment, the HE-LTF size corresponds to one of 1×HE-LTF, 2×HE-LTF, and 4×HE-LTF, where 1×HE-LTF has a shortest duration, 4×HE-LTF corresponds to four times the duration of 1×HE-LTF, and 2×HE-LTF corresponds to two times the duration of 1×HE-LTF. HE-LTFs 235 are used by a receiver to calculate a channel estimate for purposes of equalization, beamforming, etc., for example. Generally, a longer HE-LTF facilitates generating a more accurate channel estimate (especially for longer range communications with longer delay spread), but increases overhead (e.g., more medium time is devoted to transmission of training signals rather than data). In better channel conditions and/or for shorter range communications, a shorter HE-LTF size can be used, at least in some embodiments.

The GI duration corresponds to a duration of a guard interval in an OFDM symbol of the data unit 200. In an embodiment, the GI duration is selected to be one of 0.8 µs, 1.6 µs, and 3.2 µs. GIs are included to reduce inter-symbol interference (ISI) caused by multipath reflections, for example. ISI generally increases with longer range transmissions. Generally, a longer GI duration decreases ISI but reduces the data rate. In better channel conditions and/or for shorter range communications, a shorter GI duration can be used, at least in some embodiments.

$N_{SS}$ corresponds to a number of spatial streams to be used for transmission of the data unit 200. Maximum PE duration corresponds to a maximum duration of the PE field in the data unit 200. In an embodiment, the maximum PE duration is selected to be one of 0 µs, 4 µs, 8 µs, 12 µs, and 16 µs.

DCM corresponds to the use of multiple subcarriers to modulate the same information in at least a portion of the data unit 200. In an embodiment, the use of an ER format corresponds to modulating multiple OFDM symbols in at least a portion of the data unit 200 with the same bits of information.

Different selections of one or more of the above parameters result in corresponding different rates of transmission of the data unit 200 from a PHY entity (e.g. PHY processor 130 and/or PHY processor 170). For instance, in an embodiment, a first selection of MCS, BW, HE-LTF size, GI duration, $N_{SS}$, and maximum PE duration results in at least the data portion 240 of the data unit 200 being transmitted at a first rate of transmission. A second selection of MCS, BW, HE-LTF size, GI duration, $N_{SS}$, and maximum PE duration results in at least the data portion 240 of the data unit 200 being transmitted at a second rate of transmission. As merely an example, in an embodiment where the second selection of parameters has identical MCS, BW, HE-LTF size, $N_{SS}$, and maximum PE duration as the first selection of parameters, but has a GI duration that is shorter than a GI duration in the first selection of parameters, the second rate of transmission is higher than the first rate of transmission.

Different selections of one or more of the above parameters result in corresponding different receiver sensitivities at a communication device that receives the data units, such as the data unit 200. In an embodiment, receiver sensitivity can be determined as a minimum received signal power (e.g., at an antenna of a receiving communication device) of the data units that corresponds to a particular error rate at the receiving communication device. For instance, in an embodiment, an error rate is determined as a packet error rate (PER), which is a ratio of packets (e.g., PPDUs, MPDUs, etc.) received in error to a total number of received packets. In an embodiment, the receiver sensitivity is measured as a minimum received signal power that corresponds to a PER of 10%. A lower minimum received signal power corresponds to a higher receiver sensitivity. In other embodiments, the receiver sensitivity is measured as a minimum received signal power that corresponds to another suitable PER, such as 5%, 6%, 7%, 8%, 9%, 11%, 12%, 13%, etc. In other embodiments, receiver sensitivity is measured based on other suitable error rate measurements, such as a bit error rate (BER). In other embodiments, receiver sensitivity is measured based on one or more other suitable criteria, such as a signal to noise ratio (SNR), signal to interference plus noise ratio (SINR), a received signal power indication (RSSI), etc.

In an embodiment, a first selection of MCS, BW, HE-LTF size, GI duration, $N_{SS}$, and maximum PE duration results in a first receiver sensitivity at a receiving communication device. A second selection of MCS, BW, HE-LTF size, GI duration, $N_{SS}$, and maximum PE duration results in a second receiver sensitivity. As merely an example, in an embodiment where the second selection of parameters has identical MCS, BW, GI duration, and $N_{SS}$ as the first selection of parameters, but has an HE-LTF size of 1×HE-LTF compared to an HE-LTF size of 4×HE-LTF in the first selection of parameters, the first receiver sensitivity is better (i.e., has a lower minimum received signal power) than the second receiver sensitivity. In an embodiment, a smaller HE-LTF size generally results in more error-prone reception of data units because a channel estimate generated at a receiver is less accurate as compared to a channel estimate generated using a larger HE-LTF size.

In an embodiment, not all possible combinations of communication parameters are available for selection. In an embodiment, the communication protocol does not permit using one or more HE-LTF sizes with particular selections of GI durations. For instance, the communication protocol only permits using the GI duration of 3.2 µs with an HE-LTF size of 4×HE-LTF at least for certain types of transmissions, according to an embodiment. As another example, the communication protocol does not permit using the HE-LTF size of 1×HE-LTF for multi-user transmissions, according to an embodiment. In an embodiment, limiting the use of smaller HE-LTF sizes improves receiver sensitivity performance corresponding to at least some combinations of parameters.

In an embodiment, a set of allowable combinations of communication parameters are defined (e.g., by a particular WLAN implementation, by the communication protocol (such as the 802.11 standard), and/or type of data unit (SU, MU, trigger-based, etc.) being transmitted, etc.) and a transmitting device selects a particular combination from the set for generation and transmission of the data unit 200. For instance, in an embodiment, the communication protocol does not allow independent selections of HE-LTF size and GI durations and only allows selection from the following set of HE-LTF size and GI duration combinations: 4×HE-LTF size and 3.2 µs GI duration, 4×HE-LTF size and 0.8 µs GI duration, 2×HE-LTF size and 1.6 µs GI duration, 2×HE-LTF size and 0.8 µs GI duration, 1×HE-LTF size and 1.6 µs GI duration, and 1×HE-LTF size and 0.8 µs GI duration, at least for some types of transmissions. In an embodiment, the set of HE-LTF size and GI duration combinations are further limited by the capabilities (e.g. PHY processor capabilities, MAC processor capabilities) of the transmitting communication device and the receiving communication device. For instance, only those combinations of HE-LTF size and GI duration are included in the set that both the transmitting communication device and the receiving communication device are capable of encoding/transmitting and receiving/decoding.

In an embodiment, a communication device maintains (e.g., the network interface device 122, the MAC processor 126, the network interface device 162, the MAC processor 166, etc., maintains) a table (referred to herein as a "master rate table") that associates different sets of allowed communication parameter values with respective data rates. In various embodiments, the master rate table is organized in order of data rate (e.g., ascending order or descending order). The communication device uses (e.g., the network interface device 122, the MAC processor 126, the network interface device 162, the MAC processor 166, etc., uses) the master rate table to select a set of communication parameter values based on channel conditions, e.g., one or more of PER, BER, SNR, SINR, RSSI, etc., according to an embodiment. Additionally, the communication device uses (e.g., the network interface device 122, the MAC processor 126, the network interface device 162, the MAC processor 166, etc., uses) the master rate table to adjust the data rate and to select a new set of communication parameter values based on channel conditions, e.g., one or more of PER, BER, SNR, SINR, RSSI, etc., and/or receiver sensitivity, according to some embodiments.

FIG. 3 is a diagram of an example master rate table 300, according to an embodiment. The master rate table 300 includes rows 302 corresponding to different sets of communication parameter values. The master rate table 300 includes a column 304 that corresponds to data rate. The master rate table 300 also includes columns 306-318, which correspond to various communication parameters. In other embodiments, the master rate table 300 includes one or more other columns specifying one or more other communication parameters and/or excludes one or more of the columns 306-318. The data rate in column 304 for a particular row 302 corresponds to the communication parameter values in columns 306-316 for the particular row.

In an embodiment, the rows 302 are arranged according to an ordering of transmission rates (as specified in column 304). For example, the rows 302 are arranged in a descending order of transmission rates (as specified in column 304), according to an embodiment. As another example, the rows 302 are arranged in an ascending order of transmission rates (as specified in column 304), according to another embodiment. Transmission rates are characterized by a measure of a number of bits (e.g., in a data portion 240 of a data unit 200) transmitted in given instance of time. For example, transmission rates may be measured in bits per second (bps), kilobits per second (kbps), megabits per second (Mbps), etc. In an embodiment, a transmission rate (column 304) corresponding to a particular row 302 is determined for the combination of HE-LTF size and GI duration as specified in column 308 (e.g., 4×HE-LTF and a GI duration of 3.2 µs), and rows 302 are arranged in a descending order of the corresponding determined transmission rates. In other words, the transmission rates in column 304 all assume the same combination of HE-LTF size and GI duration (e.g., 4×HE-LTF and a GI duration of 3.2 µs), according to an embodiment. While column 308 is illustrated with a particular HE-LTF size and GI duration combination, in another embodiment a different HE-LTF size and GI duration combination is used. In an embodiment, if all of the values in column 308 are the same, column 308 is omitted from the master rate table 300, and the Column 306 specifies a transmission bandwidth, column 310 specifies a number of spatial streams, column 312 specifies an MCS, column 314 specifies a maximum packet extension duration, and column 316 specifies whether DCM and/or an ER format is to be used.

The communication parameters corresponding to columns 306, 310, 312, 314, and 316 are sometimes referred to herein as first communication parameters, and the communication parameter corresponding to column 308 is sometimes referred to herein as a second communication parameter. In an embodiment, the values in columns 306, 310, 312, 314, and 316, in each row 302, correspond to respective first values of the plurality of first communication parameters. In an embodiment, column 308 corresponds to respective default values of the second communication parameter with respect to the different rows 302. In an embodiment, the value in column 308, in each row 302, corresponds to a respective default second value of the second communication parameter. The data rate in column 304 for a particular row 302 corresponds to the first communication parameters set to the first values in columns 306-316, and the second communication parameter set to the default second value in column 308.

A communication device transmits a data unit 200 using communication parameters that provide an optimum level of performance in a given environment. In an embodiment, the communication device uses a combination of communication parameter values from a particular row 302. For instance, in an embodiment, a communication device transmits one or more data units 200 using the set of communication parameters corresponding to a row 302-2, i.e., a bandwidth indicated in column 306, an HE-LTF size and GI duration combination indicated in column 308, an $N_{SS}$ indicated in column 310, an MCS indicated in column 312, a maximum PE duration indicated in column 314, and use of DCM/ER indicated in column 316.

In an embodiment, column 318 corresponds to the second communication parameter, to which column 308 also corresponds. Column 318 indicates respective one or more alternative second values for the second communication parameter, according to an embodiment. The respective one or more alternative second values in column 318 will be described in more detail below.

In an embodiment, a communication device is configured to dynamically change values of the communication parameters, based on changing channel conditions, data transmission performance, etc., using the master rate table 300. For instance, if the communication device is transmitting using a combination of communication parameter values corresponding to the row 302-1 and detects worsening channel conditions (e.g., an increasing PER that exceeds a first threshold), the communication device may begin transmitting using a combination of communication parameter values from the row 302-2, which corresponds to a lower transmission rate. On the other hand, if the communication device detects improving channel conditions (e.g., a decreasing PER that falls below a second threshold), the communication device may begin transmitting using a combination of communication parameter values from the row 302-0, which corresponds to a higher transmission rate, at least in some scenarios.

As described above, a larger HE-LTF size generally results in better receiver sensitivity but lower throughput while, correspondingly, a smaller HE-LTF size generally reduces receiver sensitivity but increases throughput. Similarly, a longer GI generally results in better receiver sensitivity but lower throughput while, correspondingly, a shorter GI generally reduces receiver sensitivity but increases throughput. In an embodiment, column 308 includes only a single HE-LTF size and GI duration combination (an example of the second communication parameter), i.e., a default value of the HE-LTF size/GI duration parameter. A separate column 318 indicates different HE-LTF size/GI duration combinations, as compared to column 308, that are to be evaluated, at least in some circumstance, when considering a change in data rate. In an embodiment, wherein column 308 corresponds to a 4×HE-LTF and 3.2 µs GI duration combination, other combinations, such as 4×HE-LTF and 0.8 µs GI duration, 2×HE-LTF and 1.6 µs GI duration, 2×HE-LTF and 0.8 µs GI duration, 1×HE-LTF and 1.6 µs GI duration, and 1×HE-LTF and 0.8 µs GI duration, are indicated in the column 318. In the example master rate table 300 of FIG. 3, only the 2×HE-LTF and 1.6 µs GI duration combination and the 1×HE-LTF and 1.6 μs GI duration are indicated in column 318. In other embodiments, one or more other HE-LTF size/GI duration combinations are included and/or one or both of the HE-LTF size/GI duration combinations illustrated in FIG. 3 are omitted, at least for some rows 302.

As shown in table 300, one or more other combinations of HE-LTF sizes and GI durations are indicated in column 318, and a HE-LTF size/GI duration parameter value from column 318 may be used in lieu of the default value from column 308. It is possible, in at least some embodiments, that a PHY data unit transmitted using the communication parameter values in columns 306, and 310-316 in row 302-1 with a particular HE-LTF size/GI duration combination selected from column 318/row 302-1 has a higher data rate than another PHY data unit transmitted using communication parameters selected from columns 306-316 of row 302-0 above. For instance, the communication parameter values in columns 306, and 310-316 in row 302-1 with an HE-LTF size of 2×HE-LTF and a GI duration of 0.8 μs (as selected from column 318/row 302-1) may have a higher transmission rate than communication parameter values selected from row 302-0 with an HE-LTF size of 4×HE-LTF and a GI duration of 3.2 μs (as selected from column 308/row 302-0). While in the example master rate table 300, column 318 specifies an identical set of combinations of HE-LTF size and GI duration for each row 302, in other embodiments, different rows 302 have different sets of combinations of HE-LTF size and GI duration in column 318.

While particular combinations of communication parameters are specified as rows 302 in the master rate table 300, the master rate table 300 may include other different suitable combinations and/or may be dynamically modified based on a particular WLAN implementation, the communication protocol, a type of data unit (SU, MU, trigger based, etc.) being transmitted, and/or other channel characteristics, etc. In an embodiment, the communication device may use a plurality of master rate tables (similar to the master rate table 300) corresponding to different combinations of communication parameters and may select a particular table based on one or more of the above-discussed criteria, and/or based on other suitable criteria. In an embodiment, one or more of the plurality of the master rate tables may include columns different from the columns 306-318, and/or may omit one or more of the columns 306-318.

In an embodiment, different master rate tables are utilized for different PHY data unit formats and/or for different PHY transmission modes. For example, a first master rate table is used for single user (SU) transmissions whereas a second master rate table is used for multi-user (MU) transmissions, such as OFDMA transmissions and/or MU-MIMO transmissions.

In an embodiment, the AP 114 (e.g., the network interface 122, the MAC processor 126, etc.) maintains different master rate tables for different client stations 154. For example, different client stations 154 may have different capabilities, and thus one master rate table (corresponding to a particular client station 154) may not include some rows that are included in other master rate tables (corresponding to other client stations 154) because such rows may correspond to one or more communication parameters that the particular client station 154 does not support.

In an embodiment, a master rate table for use with MU transmissions may include multiple columns corresponding to a single communication parameter, each of such columns corresponding to a particular client station in the MU transmission. For instance, in an embodiment, a master rate table may include a set of multiple columns to respective sizes of RUs assigned to respective client stations in an OFDMA transmission. As another example, a master rate table may include a set of columns specifying respective numbers of spatial streams assigned to respective client stations in an MU-MIMO transmission.

In an embodiment, the master rate table 300 is stored in a memory of a communication device (e.g., a memory of the network interface 122, a memory of, or coupled to, the MAC processor 126, a memory of the network interface 162, a memory of, or coupled to, the MAC processor 156, etc.). In an embodiment, the master rate table 300 is stored as a look-up table in the memory. In an embodiment, one or more communication parameters of a combination of communication parameters in a row 302 are retrieved from memory by the network interface 122, the MAC processor 126, the network interface 162, the MAC processor 166, etc., and the network interface 122, the MAC processor 126, the network interface 162, the MAC processor 166, etc., uses the retrieved communication parameters to generate and transmit a PHY data unit.

Figure 4A:
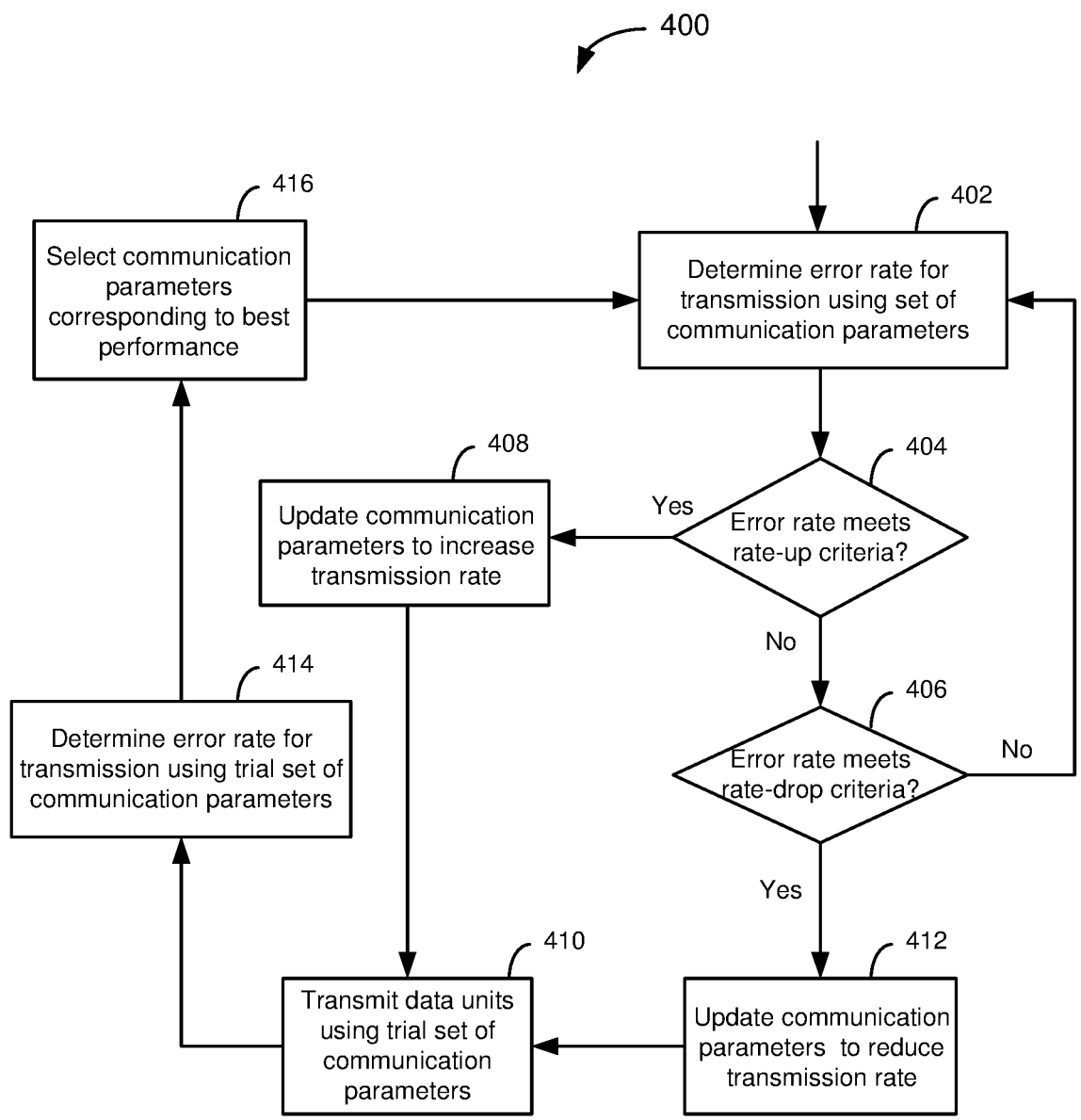
FIG. 4A is a flow diagram of an example method for adjusting communication parameters at a communication device, according to an embodiment.

As described above, a communication device may adjust communication parameter values under certain situations (e.g., changing channel conditions, transmission performance, etc.). FIG. 4A is a flow diagram of an example method 400 for adjusting communication parameters at a communication device, according to an embodiment. In some embodiments, the AP 114 (e.g., the network interface 122) and/or the client station 154-1 (e.g., the network interface 162) of FIG. 1 are configured to implement the method 400. The method 400 is described in the context of the AP 114 performing the method 400 merely for explanatory purposes and, in other embodiments, the method 400 is implemented by another suitable device (e.g., the client station 154, another suitable communication device, etc.). The method 400 is also described in the context of the master rate table 300 (FIG. 3) merely for explanatory purposes and, in other embodiments, the method 400 utilizes another suitable master rate table.

The method 400 assumes that the AP 114 has transmitted one or more PHY data units to one or more other communication devices (e.g., one or more client station 154) using a selected set of communication parameters that corresponds to a particular row k of the master rate table 300. As an illustrative example, the AP 114 transmits one or more PHY data units using a combination of communication parameter values corresponding to the row 302-k of the master rate table 300.

At block 402, the AP 114 determines (e.g., the network interface 122 determines, the MAC processor 126 determines, etc.) a measure of an error rate corresponding to the transmission of the one or more data units. For example, the communication device receives feedback from the one or more other communication devices, wherein the feedback indicates an error level corresponding to the packets. As an illustrative example, the one or more client stations 154 transmit one or more ACKs (and optionally negative acknowledgment (NACK) information) to the AP 114 corresponding to the one or more PHY data units. The AP 114 then determines a PER corresponding to the one or more PHY data units based on the received one or more ACKs (an optionally NACK information). For example, if the AP 114 does not receive an ACK for a particular MPDU in a PHY data unit (or receives a NACK for the particular MPDU), the AP 114 determines that there was an error with the particular PHY data unit and/or the particular MPDU. In other embodiments, the one or more client stations 154 additionally or alternatively provide other types of feedback corresponding to the one or more PHY data units (e.g., a BER) to the AP 114, which the AP 114 uses to determine an error rate.

At block 404, the AP 114 determines if a criteria for increasing the transmission rate has been satisfied. For instance, the AP 114 determines based on the feedback information (block 402) whether the criteria for increasing the transmission rate has been satisfied. In an embodiment, the AP 114 determines that the criteria has been satisfied if the PER (or another suitable error rate measure) is below a first threshold. In an embodiment, the AP determines the PER (or another suitable error rate measure) over a duration a time and determines that the criteria has been satisfied if the PER is maintained below the first threshold for the duration of time.

If it is determined at block 404 that the criteria for increasing the transmission rate has not been satisfied, the method proceeds to block 406. At block 406, the AP 114 determines if a criteria for decreasing the transmission rate has been satisfied. For instance, the AP 114 determines based on the feedback information (block 402) whether the criteria for decreasing the transmission rate has been satisfied. In an embodiment, the AP 114 determines that the criteria has been satisfied if the PER (or another suitable error rate measure) is above a second threshold. In an embodiment, the AP determines the PER (or another suitable error rate measure) over a duration a time and determines that the criteria has been satisfied if the PER is maintained above a second threshold for the duration of time.

If it is determined at block 406 that the criteria for decreasing the transmission rate has not been satisfied, the AP 114 transmits one or more further PHY data units to the one or more client stations using the previously selected set of communication parameters that corresponds to the particular row k of the master rate table 300, and the method proceeds back to block 402.

If it is determined at block 404 that the criteria for increasing the transmission rate has been satisfied, the method proceeds to block 408. At block 408, the AP 114 selects (e.g., the network device 122 selects, the MAC processor 126 selects, etc.) one or more trial sets of communication parameters corresponding to an increased rate of transmission. Example techniques for selection of the one or more trial sets of communication parameters at block 408 will be described below with respect to FIG. 4B. After selection of the one or more trial sets of communication parameters at block 408, the flow proceeds to block 410, which will be described below.

If it is determined at block 406 that criteria for decreasing the transmission rate has been satisfied, the flow proceeds to block 412. At block 412, the AP 114 selects one or more trial sets of communication parameters corresponding to a decreased rate of transmission. For instance, the AP 114 selects a combination of communication parameters indicated by an adjacent row that corresponds to a lower transmission rate, according to an embodiment. For example, if the rows of the master rate table are arranged in order of increasing transmission rates (e.g., as increasing k corresponds to increasing transmission rates), block 412 includes selecting a combination of communication parameters corresponding to the row 302-($k$−1). In another embodiment, if the HE-LTF size/GI duration combination in the previously selected set of communication parameters (corresponding to row 302-$k$) corresponds to a GI duration that is shorter than the GI duration indicated in row 302-$k$, column 308, the AP 114 selects a trial set of communication parameters as the values specific in columns 306-316 of row 302-$k$, i.e., the trial set of communication parameters includes the default value in row 302-$k$, column 308 (e.g., a default value of the HE-LTF size/GI duration parameter, or another suitable communication parameter). The flow then proceeds to block 410.

At block 410, the AP 114 transmits one or more further PHY data units to one or more client stations 154 using the trial set of communication parameters selected at block 408 or block 412. In an embodiment where multiple trial sets of communication parameters are selected at block 408 or block 410, the AP 114 transmits a first set of one or more further PHY data units using a first trial set of selected communication parameters, transmits a second set of one or more PHY data units using a second trial set of selected communication parameters, etc.

At block 414, the AP 114 determines a measure(s) of error rate corresponding to the one or more further PHY data units transmitted at block 412. For example, the communication device receives feedback from the one or more other communication devices, wherein the feedback indicates an error level corresponding to the packets (similar to block 402 discussed above). If block 410 includes transmitting multiple sets of PHY data units using different trial sets of communication parameters, block 414 includes the AP 114 similarly determining multiple measures of error rate corresponding to the different trial sets of the communication parameters, etc.

At block 416, the AP 114 determines a new selected set of communication parameters for future transmission of PHY data units to the one or more client stations 154 based on the error rate measurement(s) made at block 414. In an embodiment, the new set of communication parameters selected at block 400 corresponds to a set that results in a best measure of effective throughput based on the measurement(s) made at block 414. For instance, in an embodiment the AP 114 selects from the sets of communication parameters used at block 412, a set of communication parameters that corresponds to a best PER performance in the transmission to the one or more client stations 154. In an embodiment, if it is determined that none of the trial sets of communication parameters evaluated at block 414 resulted in an improved effective throughput with respect to the previously selected set of communication parameters evaluated at block 402, the AP 114 retains the use of the previously selected set of communication parameters for future transmissions to the one or more client stations 154.

Figure 4B:
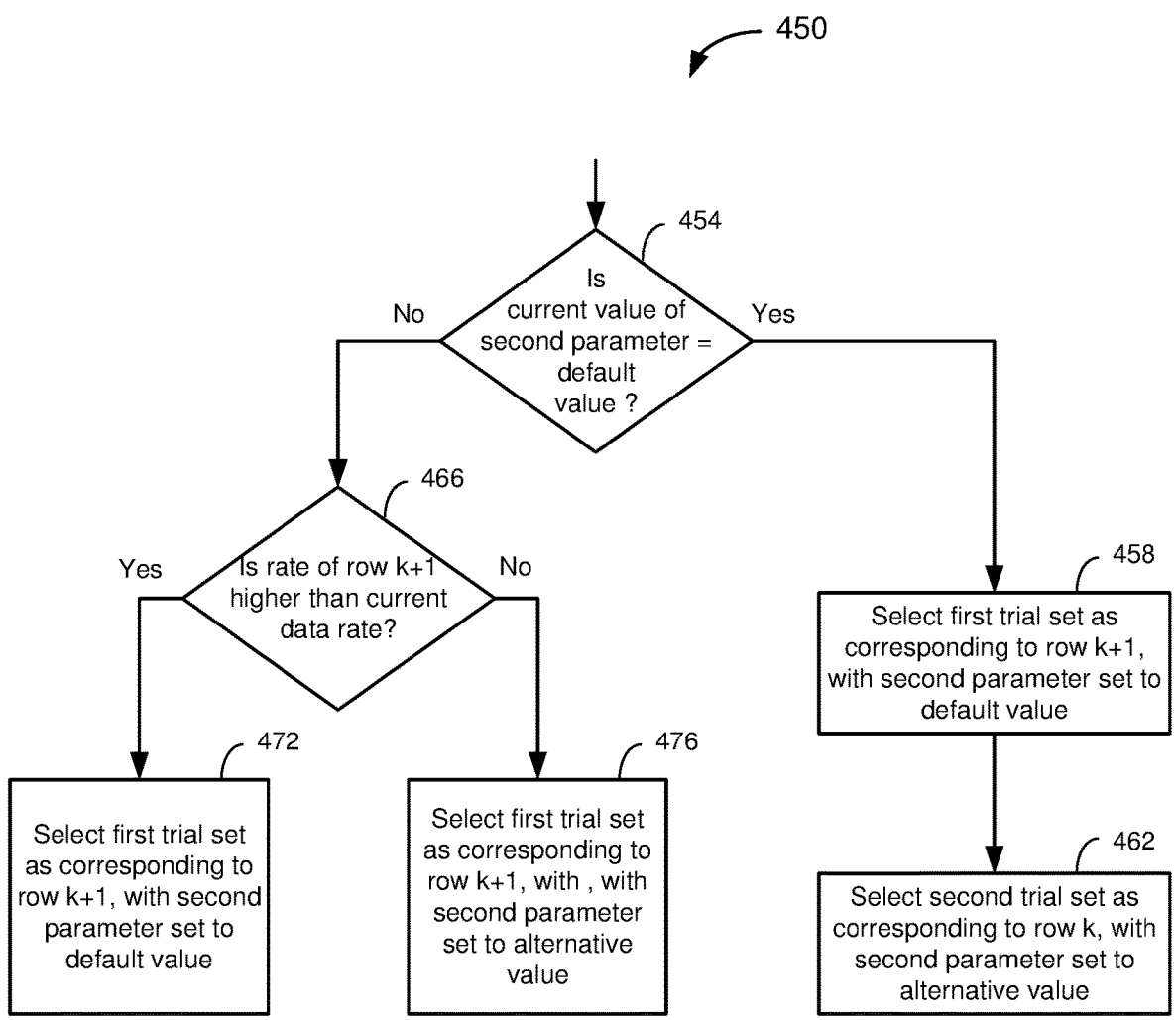
FIG. 4B is a flow diagram of an example method for selecting one or more sets of communication parameters corresponding to an increased transmission rate, according to an embodiment.

FIG. 4B is a flow diagram of an example method 450 for selecting one or more sets of communication parameters corresponding to an increased transmission rate, according to an embodiment. Referring now to FIGS. 4A and 4B, block 408 includes performing the method 450, according to an embodiment. In some embodiments, the AP 114 (e.g., the network interface 122) and/or the client station 154-1 (e.g., the network interface 162) of FIG. 1 are configured to implement the method 450. The method 450 is described in the context of the AP 114 performing the method 450 merely for explanatory purposes and, in other embodiments, the method 450 is implemented by another suitable device (e.g., the client station 154, another suitable communication device, etc.). The method 450 is also described in the context of the master rate table 300 (FIG. 3) merely for explanatory purposes and, in other embodiments, the method 420 utilizes another suitable master rate table.

The method 450 assumes that the AP 114 has transmitted one or more PHY data units to one or more other communication devices (e.g., one or more client station 154) using a selected set of communication parameters that corresponds to a particular row k of the master rate table 300. As an illustrative example, the AP 114 transmits one or more PHY data units using a combination of communication parameter values corresponding to the row 302-$k$ of the master rate table 300.

At block 454, the AP 114 determines whether a value of the second parameter (e.g., the HE-LTF size/GI duration parameter or another suitable communication parameter) in the selected set of communication parameters (corresponding to row 302-$k$) that was used to transmit one or more PHY data units is equal to the default value in column 308. If the value of the second parameter is equal to the default value in column 308, the flow proceeds to block 458.

At block 458, the AP 114 selects a first trial set of communication parameters as the set of values specified in an adjacent row that corresponds to a higher transmission rate, with the value of the second parameter (e.g., the HE-LTF size/GI duration parameter or another suitable communication parameter) set to the default value in column 308 of the adjacent row. For example, if the rows of the master rate table are arranged in order of increasing transmission rates (e.g., as increasing k corresponds to increasing transmission rates), the AP 114 selects a first trial set of communication parameters as the set of values specified in row 302-($k$+1), with the value of the second parameter (e.g., the HE-LTF size/GI duration parameter or another suitable communication parameter) set to the default value in column 308, row 302-($k$+1). At block 462, the AP 114 selects a second trial set of communication parameters as the set of values specified in row 302-$k$, but with the value of the second parameter (e.g., the HE-LTF size/GI duration) set to one of the alternative value(s) in column 318, row 302-$k$. If the column 318 specifies multiple alternative values, the method further comprises selecting a third trial set of communication parameters as the set of values specified in row 302-$k$, but with the value of the second parameter (e.g., the HE-LTF size/GI duration) set to another one of the alternative values in column 318, row 302-$k$, etc.

On the other hand, if the AP 114 determines, at block 454, that the value of the second parameter in the selected set of communication parameters (corresponding to row 302-$k$) is not equal to the default value in column 308, the flow proceeds to block 466. At block 466, the AP 114 determines whether a data rate corresponding to the adjacent row that corresponds to a higher data rate (e.g., as indicated by column 304) is higher than the current data rate. For example, if the rows of the master rate table are arranged in order of increasing transmission rates (e.g., as increasing k corresponds to increasing transmission rates), the AP 114 determines whether a data rate corresponding to row 302-($k$+1) (e.g., as indicated in column 304) is higher than the current data rate. If the AP 114 determines that the data rate corresponding to row 302-($k$+1) is higher than the current data rate, the flow proceeds to block 472.

At block 472, the AP 114 selects the first trial set of communication parameters as the set of values specified in the adjacent row that corresponds to a higher data rate (e.g., as indicated by column 304), with the value of the second parameter (e.g., the HE-LTF size/GI duration) set to the default value in column 308. For example, if the rows of the master rate table are arranged in order of increasing transmission rates (e.g., as increasing k corresponds to increasing transmission rates), the AP 114 selects the first trial set of communication parameters as the set of values specified in row 302-($k$+1), with the value of the second parameter (e.g., the HE-LTF size/GI duration) set to the default value in column 308, row 302-($k$+1).

On the other hand, if the AP 114 determines, at block 466, that the data rate corresponding to row 302-($k$+1) is not higher than the current data rate, the flow proceeds to block 476. At block 476, the AP 114 selects the first trial set of communication parameters as the set of values specified in row that corresponds to a higher data rate (e.g., as indicated by column 304), but with the value of the second parameter (e.g., the HE-LTF size/GI duration) set to one of the alternative value(s) in column 318. For example, if the rows of the master rate table are arranged in order of increasing transmission rates (e.g., as increasing k corresponds to increasing transmission rates), the AP 114 selects the first trial set of communication parameters as the set of values specified in row 302-($k$+1), but with the value of the second parameter (e.g., the HE-LTF size/GI duration) set to one of the alternative value(s) in column 318, row 302-($k$+1). If the column 318 specifies multiple alternative values, the method further comprises selecting a second trial set of communication parameters as the set of values specified in row 302-($k$+1), but with the value of the second parameter (e.g., the HE-LTF size/GI duration) set to another one of the alternative values in column 318, row 302-($k$+1), etc.

Referring again to FIG. 4A, updating communication parameters to reduce the transmission rate at block 412 involves a method similar to the example 450 of FIG. 4B, according to an embodiment. For example, block 412 may include, when the current set of communication parameter values includes the second parameter (e.g., the HE-LTF size/GI duration) set to one of the alternative values in column 318, determining one or trial sets of communication parameter values as the set of values specified in row 302-$k$, but with the value of the second parameter (e.g., the HE-LTF size/GI duration) set to another one of the alternative values in column 318 and/or set to the default value in column 308. Additionally, block 412 may include, when the current set of communication parameter values includes the second parameter (e.g., the HE-LTF size/GI duration) set to the default value in column 308, determining one or trial sets of communication parameter values as the set of values specified in an adjacent row corresponding to a lower data rate (e.g., row 302-($k$–1) when increasing k corresponds to increasing transmission rates), but with the value of the second parameter (e.g., the HE-LTF size/GI duration) set to one or more of the alternative values in column 318 of the adjacent row (e.g., row 302-($k$–1)).

Figure 5:
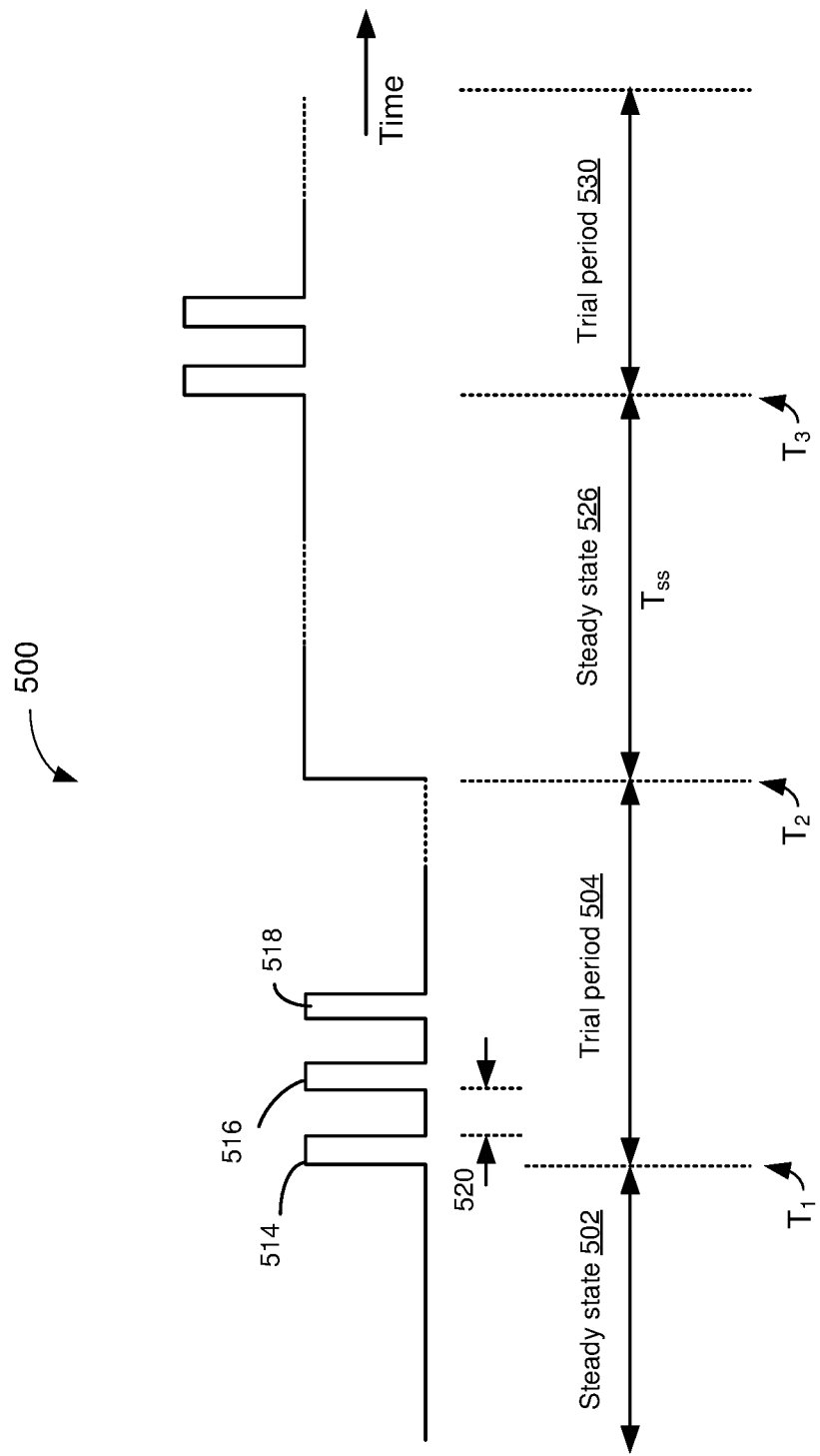
FIG. 5 is a timing diagram illustrating the transmission of PHY data units using trial sets of communication parameters, according to an embodiment.

Referring again to FIG. 4A, block 410 involves transmitting PHY data units using trial sets of communication parameters, and block 414 involves determining error rates corresponding to the transmission of PHY data units using the trial sets of communication parameters. FIG. 5 is a timing diagram 500 illustrating the transmission of PHY data units using trial sets of communication parameters, according to an embodiment. In an embodiment, the timing diagram 500 corresponds to a communication device implementing the method 400 of FIG. 4A.

A time period 502 corresponds to the transmission of PHY data units using the set of communication parameters that corresponds to row 302-$k$ of the master rate table 300. During time period 502, the AP 114 determines the measure of the error rate at block 402.

A time period 504 corresponds to i) the AP transmitting PHY data units using one or more trial sets of communication parameters (block 410), and ii) determining error rates corresponding to the one or more trial sets of communication parameters (block 414).

The AP 114 transmits the one or more PHY data units during each of time sub-periods 514, 516, and 518 within the time period 504. While three time sub-periods 514, 516, and 518 are illustrated in FIG. 5, in other embodiments the one or more PHY data units are transmitted within each of other suitable numbers of time sub-periods. In an embodiment, a different trial set of communication parameters is transmitted in each of the time sub-periods 514, 516, and 518. In another embodiment, a same trial set of communication parameters is transmitted in each of the time sub-periods 514, 516, and 518.

In an embodiment, the AP 114 transmits one or more aggregate MPDUs (A-MPDUs) during each time sub-periods 514, 516, and 518, and waits for error feedback information regarding the one or more A-MPDUs after each time sub-periods 514, 516, and 518. In an embodiment, each A-MPDU transmitted during the time sub-periods 514, 516, 518 includes MPDUs having a minimum length. In an embodiment, a suitable minimum number of A-MPDUs is transmitted in each time sub-period 514, 516, and 518. In an embodiment, the AP 114 uses a request-to-send/clear-to-send (RTS/CTS) protocol when transmitting A-MPDUs during the time sub-periods 514, 516, 518 to reduce the chance of collisions, which would increase the measured error rate.

In an embodiment, the AP 114 waits for at least time period ($T_{bo}$) 520 after each time sub-period 514, 516, 518 to receive feedback information. In an embodiment, the AP 114 falls back to utilizing the set of communication parameters used during time period 502 for any transmissions during the time sub-periods 514, 516, 518.

After the AP 114 selects a new set of communication parameters (block 416), the AP 114, at time $T_2$, the AP starts transmitting PHY data units using the new set of communication parameters for at least a steady state time period ($T_{SS}$) 526. During the $T_{SS}$ 526 or after the $T_{SS}$ 526, if the AP 114 once again determines that a criteria for changing the transmission rate has been satisfied, the AP may again initiate another trial period 530 starting at time $T_3$.

Embodiment 1

A method, comprising: storing, in a memory device of a first communication device, a master rate table, wherein the master rate table comprises a plurality of rows that correspond to i) respective data rates, and ii) respective sets of communication parameter values corresponding to the respective sets of data rates, each set of communication parameter values includes i) a respective plurality of first values corresponding to a plurality of first parameters, ii) respective one or more default second values corresponding to one or more second parameters, and iii) respective one or more alternative second values corresponding to the one or more second parameters. The method also comprises: determining, at the first communication device, a first error rate measure corresponding to transmission of one or more first data units by the first communication device to a second communication device according to a first set of communication parameter values, wherein the first set of communication parameter values correspond to i) a first row of the master rate table, and ii) a first transmission data rate; and when the first communication device determines that a new transmission rate should be used, selecting, at the first communication device, new communication parameter values using the master rate table, including: when the first set of communication parameter values includes the respective one or more default second values corresponding to the first row of the master rate table, determining, at the first communication device, a first trial set of communication parameter values as i) the respective plurality of first values corresponding to the first row of the master rate table, and ii) at least one of the respective one or more alternative second values corresponding to the one or more second parameters that correspond to the first row of the master rate table, determining, at the first communication device, a second error rate measure corresponding to transmission of one or more second data units by the first communication device to the second communication device according to the first trial set of communication parameter values, and selecting, at the first communication device, the new communication parameter values based on the second error rate measure.

Embodiment 2

The method of Embodiment 1, wherein selecting the new communication parameter values further comprises: when the first communication device determines that the new transmission rate should be used, and when the first set of communication parameter values includes the respective one or more second default values corresponding to the first row of the master rate table: determining, at the first communication device, a second trial set of communication parameter values as i) the respective plurality of first values corresponding to a second row of the master rate table, and ii) the respective one or more default second values corresponding to the second row of the master rate table, wherein the second row of the master rate table corresponds to a second transmission data rate that is different than the first transmission data rate, determining, at the first communication device, a third error rate measure corresponding to transmission of one or more second data units by the first communication device to the second communication device according to the second trial set of communication parameter values, and selecting, at the first communication device, the new communication parameter values further based on the third error rate measure.

Embodiment 3

The method of either of Embodiments 1 or 2, wherein selecting the new communication parameter values further comprises: when the first communication device determines that the new transmission rate should be used, and when the first set of communication parameter values includes one of the respective one or more alternative second values corresponding to the one or more second parameters: determining, at the first communication device, a second trial set of communication parameter values as i) the respective plurality of first values corresponding to a second row of the master rate table, and ii) the respective one or more default second values corresponding to the second row of the master rate table, wherein the second row of the master rate table corresponds to a second transmission data rate that is different than the first transmission data rate, determining, at the first communication device, a third error rate measure corresponding to transmission of one or more second data units by the first communication device to the second communication device according to the second trial set of communication parameter values, and selecting, at the first communication device, the new communication parameter values based on the third error rate measure.

Embodiment 4

The method of Embodiment 3, wherein selecting the new communication parameter values further comprises: when the first communication device determines that the new transmission rate should be used, and when the first set of communication parameter values includes one of the respective one or more alternative second values corresponding to the one or more second parameters: determining, at the first communication device, whether the second transmission data rate is greater than a current transmission data rate; wherein: determining the second trial set of communication parameter values as i) the respective plurality of first values corresponding to the second row of the master rate table, and ii) the respective one or more default second values corresponding to the second row of the master rate table is performed when the first communication device determines that the second transmission data rate that is greater than the current transmission data rate, determining the third error rate measure is performed when the first communication device determines that the second transmission data rate that is greater than the current transmission data rate, and selecting the new communication parameter values based on the third error rate measure is performed when the first communication device determines that the second transmission data rate that is greater than the current transmission data rate.

Embodiment 5

The method of Embodiment 4, wherein selecting the new communication parameter values further comprises: when the first communication device determines that the new transmission rate should be used, when the first set of communication parameter values includes one of the respective one or more alternative second values corresponding to the one or more second parameters, and when the first communication device determines that the second transmission data rate is not greater than the current transmission data rate: determining, at the first communication device, a third trial set of communication parameter values as i) the respective plurality of first values corresponding to the second row of the master rate table, and ii) at least one of the respective one or more alternative second values corresponding to i) the one or more second parameters, and ii) the second row of the master rate table, determining, at the first communication device, a fourth error rate measure corresponding to transmission of one or more fourth data units by the first communication device to the second communication device according to the third trial set of communication parameter values, and selecting, at the first communication device, the new communication parameter values based on the fourth error rate measure.

Embodiment 6

An apparatus, comprises: a network interface device associated with a first communication device. The network interface device comprises: one or more integrated circuit (IC) devices, and a memory device implemented on the one or more IC devices. The one or more IC devices are configured to: store, in the memory device, a master rate table, wherein: the master rate table comprises a plurality of rows that correspond to i) respective data rates, and ii) respective sets of communication parameter values corresponding to the respective sets of data rates, and each set of communication parameter values includes i) a respective plurality of first values corresponding to a plurality of first parameters, ii) respective one or more default second values corresponding to one or more second parameters, and iii) respective one or more alternative second values corresponding to the one or more second parameters. The one or more IC devices are further configured to: determine a first error rate measure corresponding to transmission of one or more first physical layer (PHY) data units to a second communication device according to a first set of communication parameter values, wherein the first set of communication parameter values correspond to i) a first row of the master rate table, and ii) a first transmission data rate, when the network interface device determines that a new transmission rate should be used, select new communication parameter values using the master rate table, including: when the first set of communication parameter values includes the respective one or more default second values corresponding to the first row of the master rate table, determining a first trial set of communication parameter values as i) the respective plurality of first values corresponding to the first row of the master rate table, and ii) at least one of the respective one or more alternative second values corresponding to the one or more second parameters that correspond to the first row of the master rate table, determining a second error rate measure corresponding to transmission of one or more second data units by the first communication device to the second communication device according to the first trial set of communication parameter values, and selecting the new communication parameter values based on the second error rate measure.

Embodiment 7

The apparatus of Embodiment 6, wherein the one or more IC devices are further configured to: when the network interface device determines that the new transmission rate should be used, and when the first set of communication parameter values includes the respective one or more second default values corresponding to the first row of the master rate table: determine a second trial set of communication parameter values as i) the respective plurality of first values corresponding to a second row of the master rate table, and ii) the respective one or more default second values corresponding to the second row of the master rate table, wherein the second row of the master rate table corresponds to a second transmission data rate that is different than the first transmission data rate, determine a third error rate measure corresponding to transmission of one or more second data units by the first communication device to the second communication device according to the second trial set of communication parameter values, and select the new communication parameter values further based on the third error rate measure.

Embodiment 8

The apparatus of either of Embodiments 6 or 7, wherein the one or more IC devices are further configured to: when the network interface device determines that the new transmission rate should be used, and when the first set of communication parameter values includes one of the respective one or more alternative second values corresponding to the one or more second parameters: determine a second trial set of communication parameter values as i) the respective plurality of first values corresponding to a second row of the master rate table, and ii) the respective one or more default second values corresponding to the second row of the master rate table, wherein the second row of the master rate table corresponds to a second transmission data rate that is different than the first transmission data rate, determine a third error rate measure corresponding to transmission of one or more second data units by the first communication device to the second communication device according to the second trial set of communication parameter values, and select the new communication parameter values based on the third error rate measure.

Embodiment 9

The apparatus of Embodiment 8, wherein the one or more IC devices are further configured to: when the network interface device determines that the new transmission rate should be used, and when the first set of communication parameter values includes one of the respective one or more alternative second values corresponding to the one or more second parameters: determine whether the second transmission data rate is greater than a current transmission data rate; wherein: determining the second trial set of communication parameter values as i) the respective plurality of first values corresponding to the second row of the master rate table, and ii) the respective one or more default second values corresponding to the second row of the master rate table is performed when the network interface device determines that the second transmission data rate that is greater than the current transmission data rate, determining the third error rate measure is performed when the network interface device determines that the second transmission data rate that is greater than the current transmission data rate, and selecting the new communication parameter values based on the third error rate measure is performed when the network interface device determines that the second transmission data rate that is greater than the current transmission data rate.

Embodiment 10

The apparatus of Embodiment 9, wherein the one or more IC devices are further configured to: when the network interface device determines that the new transmission rate should be used, when the first set of communication parameter values includes one of the respective one or more alternative second values corresponding to the one or more second parameters, and when the network interface device determines that the second transmission data rate is not greater than the current transmission data rate: determine a third trial set of communication parameter values as i) the respective plurality of first values corresponding to the second row of the master rate table, and ii) at least one of the respective one or more alternative second values corresponding to i) the one or more second parameters, and ii) the second row of the master rate table, determine a fourth error rate measure corresponding to transmission of one or more fourth data units by the first communication device to the second communication device according to the third trial set of communication parameter values, and select the new communication parameter values based on the fourth error rate measure.

Embodiment 11

A method, comprising: generating, at a communication device, one or more first physical layer (PHY) data units using a first set of communication parameter values, wherein the first set of communication parameter values corresponds to a first data rate; transmitting, by the communication device, the one or more first PHY data units; determining, at the first communication device, that a new data rate is to be used based on error rate information corresponding to the transmission of the one or more first PHY data units; in response to determining that the new data rate is to be used: determining, at the communication device, a plurality of trial sets of communication parameters corresponding to respective second data rates, generating, at the communication device, respective sets of one or more second PHY data units using the plurality of trial sets of communication parameter values, transmitting, by the communication device, the respective sets of one or more second PHY data units during a first contiguous time period for evaluating the plurality of trial sets of communication parameter values, and selecting, at the communication device, a new set of communication parameter values based on error rate information corresponding to the transmission of the respective sets of one or more second PHY data units during the first contiguous time period. The method further comprises: transmitting, by the communication device, one or more third PHY data units using the new set of communication parameter values during a second contiguous time period after the first contiguous time period.

Embodiment 12

The method of Embodiment 11, wherein: the respective sets of one or more second PHY data units includes i) a first set of one or more second PHY data units generated using a first trial set of communication parameter values among the plurality of trial sets of communication parameters, and ii) a second set of one or more second PHY data units generated using a second trial set of communication parameter values among the plurality of trial sets of communication parameters; transmitting the respective sets of one or more second PHY data units during the first contiguous time period comprises: transmitting, by the communication device, the first set of one or more second PHY data units during a first contiguous time subperiod, and transmitting, by the communication device, the second set of one or more second PHY data units during a second contiguous time subperiod.

Embodiment 13

The method of Embodiment 12, further comprising: generating, at the communication device, one or more fourth PHY data units using the first set of communication parameter values; and transmitting, by the communication device, the one or more fourth PHY data units during a third contiguous time subperiod between the first contiguous time subperiod and the second contiguous time subperiod.

Embodiment 14

The method of any of Embodiments 11-13, further comprising: using, by the communication device, the new set of communication parameter values for PHY data units at least for a minimum time duration.

Embodiment 15

The method of any of Embodiments 11-14, wherein selecting the new set of communication parameter values comprises: selecting the first set of communication parameter values as the new set of communication parameter values in response to determining that none of the plurality of trial sets of communication parameter values provides an acceptable error rate.

Any of Embodiments 11-15 may be combined with any of Embodiments 1-5.

Embodiment 16

An apparatus, comprising: a network interface device including one or more integrated circuit (IC) devices, wherein the one or more IC devices are configured to: generate one or more first physical layer (PHY) data units using a first set of communication parameter values, wherein the first set of communication parameter values corresponds to a first data rate, transmit the one or more first PHY data units, determine that a new data rate is to be used based on error rate information corresponding to the transmission of the one or more first PHY data units, and in response to determining that the new data rate is to be used: determine a plurality of trial sets of communication parameters corresponding to respective second data rates, generate respective sets of one or more second PHY data units using the plurality of trial sets of communication parameter values, transmit the respective sets of one or more second PHY data units during a first contiguous time period for evaluating the plurality of trial sets of communication parameter values, and select a new set of communication parameter values based on error rate information corresponding to the transmission of the respective sets of one or more second PHY data units during the first contiguous time period; wherein the one or more IC devices are configured to: transmit one or more third PHY data units using the new set of communication parameter values during a second contiguous time period after the first contiguous time period.

Embodiment 17

The apparatus of Embodiment 16, wherein: the respective sets of one or more second PHY data units includes i) a first set of one or more second PHY data units generated using a first trial set of communication parameter values among the plurality of trial sets of communication parameters, and ii) a second set of one or more second PHY data units generated using a second trial set of communication parameter values among the plurality of trial sets of communication parameters; wherein the one or more IC devices are configured to: transmit the first set of one or more second PHY data units during a first contiguous time subperiod within the first contiguous time period, and transmit the second set of one or more second PHY data units during a second contiguous time subperiod within the first contiguous time period.

Embodiment 18

The apparatus of Embodiment 17, wherein the one or more IC devices are configured to: generate one or more fourth PHY data units using the first set of communication parameter values; and transmit the one or more fourth PHY data units during a third contiguous time subperiod between the first contiguous time subperiod and the second contiguous time subperiod.

Embodiment 19

The apparatus of any of Embodiments 16-18, wherein the one or more IC devices are configured to: use the new set of communication parameter values for PHY data units transmitted during the second contiguous time period at least for a minimum time duration.

Embodiment 20

The apparatus of any of Embodiments 16-19, wherein the one or more IC devices are configured to: select the first set of communication parameter values as the new set of communication parameter values in response to determining that none of the plurality of trial sets of communication parameter values provides an acceptable error rate.

The apparatus of any of Embodiments 16-20 may be configured to implement the methods of any of Embodiments 1-5.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    storing, in a memory device of a first communication device, a master rate table, wherein the master rate table comprises a plurality of rows that correspond to
    i) respective data rates, and
    ii) respective sets of communication parameter values corresponding to the respective sets of data rates, wherein each set of communication parameter values includes:
        i) a respective plurality of first values corresponding to a plurality of first parameters,
        ii) respective one or more default second values corresponding to one or more second parameters, and
        iii) respective one or more alternative second values corresponding to the one or more second parameters;
    determining, at the first communication device, a first error rate measure corresponding to transmission of one or more first data units by the first communication device to a second communication device according to a first set of communication parameter values, wherein the first set of communication parameter values correspond to
        i) a first row of the master rate table, and
        ii) a first transmission data rate;
    when the first communication device determines that a new transmission rate should be used, selecting, at the first communication device, new communication parameter values using the master rate table, including: when the first set of communication parameter values includes the respective one or more default second values corresponding to the first row of the master rate table, determining, at the first communication device, a first trial set of communication parameter values as
        i) the respective plurality of first values corresponding to the first row of the master rate table, and
        ii) at least one of the respective one or more alternative second values corresponding to the one or more second parameters that correspond to the first row of the master rate table,
    determining, for a plurality of trial sets of communication parameter values, at the first communication device, respective error rate measures corresponding to transmission of one or more second data units by the first communication device to the second communication device according to each trial set of communication parameter values, and
    selecting, at the first communication device, the new communication parameter values based on a particular trial set of the plurality of trial sets that resulted in a best error rate performance.

2. The method of claim 1, wherein selecting the new communication parameter values further comprises: when the first communication device determines that the new transmission rate should be used, and when the first set of communication parameter values includes the respective one or more second default values corresponding to the first row of the master rate table:

determining, at the first communication device, a second trial set of communication parameter values as
        i) the respective plurality of first values corresponding to a second row of the master rate table, and
        ii) the respective one or more default second values corresponding to the second row of the master rate table, wherein the second row of the master rate table corresponds to a second transmission data rate that is different than the first transmission data rate,
    determining, at the first communication device, a third error rate measure corresponding to transmission of one or more second data units by the first communication device to the second communication device according to the second trial set of communication parameter values, and
    selecting, at the first communication device, the new communication parameter values further based on the third error rate measure.

3. The method of claim 1, wherein selecting the new communication parameter values further comprises: when the first communication device determines that the new transmission rate should be used, and when the first set of communication parameter values includes one of the respective one or more alternative second values corresponding to the one or more second parameters:

determining, at the first communication device, a second trial set of communication parameter values as
        i) the respective plurality of first values corresponding to a second row of the master rate table, and
        ii) the respective one or more default second values corresponding to the second row of the master rate table, wherein the second row of the master rate table corresponds to a second transmission data rate that is different than the first transmission data rate,
    determining, at the first communication device, a third error rate measure corresponding to transmission of one or more second data units by the first communication device to the second communication device according to the second trial set of communication parameter values, and
    selecting, at the first communication device, the new communication parameter values based on the third error rate measure.

4. The method of claim 3, wherein selecting the new communication parameter values further comprises: when the first communication device determines that the new transmission rate should be used, and when the first set of communication parameter values includes one of the respective one or more alternative second values corresponding to the one or more second parameters:

determining, at the first communication device, whether the second transmission data rate is greater than a current transmission data rate; wherein:
    determining the second trial set of communication parameter values as
        i) the respective plurality of first values corresponding to the second row of the master rate table, and
        ii) the respective one or more default second values corresponding to the second row of the master rate table is performed when the first communication device determines that the second transmission data rate that is greater than the current transmission data rate,
    determining the third error rate measure is performed when the first communication device determines that the second transmission data rate that is greater than the current transmission data rate, and
    selecting the new communication parameter values based on the third error rate measure is performed when the first communication device determines that the second transmission data rate that is greater than the current transmission data rate.

5. The method of claim 4, wherein selecting the new communication parameter values further comprises: when the first communication device determines that the new transmission rate should be used, when the first set of communication parameter values includes one of the respective one or more alternative second values corresponding to the one or more second parameters, and when the first communication device determines that the second transmission data rate is not greater than the current transmission data rate:

determining, at the first communication device, a third trial set of communication parameter values as
        i) the respective plurality of first values corresponding to the second row of the master rate table, and
        ii) at least one of the respective one or more alternative second values corresponding to
            i) the one or more second parameters, and
            ii) the second row of the master rate table,
    determining, at the first communication device, a fourth error rate measure corresponding to transmission of one or more fourth data units by the first communication device to the second communication device according to the third trial set of communication parameter values, and
    selecting, at the first communication device, the new communication parameter values based on the fourth error rate measure.

6. An apparatus, comprising:
a network interface device associated with a first communication device, the network interface device comprising:
one or more integrated circuit (IC) devices, and
a memory device implemented on the one or more IC devices, wherein the one or more IC devices are configured to:
store, in the memory device, a master rate table, wherein the master rate table comprises a plurality of rows that correspond to
i) respective data rates, and
ii) respective sets of communication parameter values corresponding to the respective sets of data rates, and each set of communication parameter values includes
i) a respective plurality of first values corresponding to a plurality of first parameters,
ii) respective one or more default second values corresponding to one or more second parameters, and
iii) respective one or more alternative second values corresponding to the one or more second parameters;
wherein the one or more IC devices are further configured to:
determine a first error rate measure corresponding to transmission of one or more first physical layer (PHY) data units to a second communication device according to a first set of communication parameter values, wherein the first set of communication parameter values correspond to
i) a first row of the master rate table, and
ii) a first transmission data rate, when the network interface device determines that a new transmission rate should be used,
select new communication parameter values using the master rate table, including: when the first set of communication parameter values includes the respective one or more default second values corresponding to the first row of the master rate table,
determine a plurality of trial sets of communication parameter values as
i) the respective plurality of first values corresponding to the first row of the master rate table, and
ii) at least one of the respective one or more alternative second values corresponding to the one or more second parameters that correspond to the first row of the master rate table,
determine respective error rate measures corresponding to transmission of one or more second data units by the first communication device to the second communication device according to each trial set of communication parameter values, and selecting the new communication parameter values based on a particular trial set of the plurality of trial sets that resulted in a best error rate performance.

7. The apparatus of claim 6, wherein the one or more IC devices are further configured to: when the network interface device determines that the new transmission rate should be used, and when the first set of communication parameter values includes the respective one or more second default values corresponding to the first row of the master rate table:
determine a second trial set of communication parameter values as
i) the respective plurality of first values corresponding to a second row of the master rate table, and
ii) the respective one or more default second values corresponding to the second row of the master rate table, wherein the second row of the master rate table corresponds to a second transmission data rate that is different than the first transmission data rate,
determine a third error rate measure corresponding to transmission of one or more second data units by the first communication device to the second communication device according to the second trial set of communication parameter values, and
select the new communication parameter values further based on the third error rate measure.

8. The apparatus of claim 6, wherein the one or more IC devices are further configured to: when the network interface device determines that the new transmission rate should be used, and when the first set of communication parameter values includes one of the respective one or more alternative second values corresponding to the one or more second parameters:
determine a second trial set of communication parameter values as
i) the respective plurality of first values corresponding to a second row of the master rate table, and
ii) the respective one or more default second values corresponding to the second row of the master rate table, wherein the second row of the master rate table corresponds to a second transmission data rate that is different than the first transmission data rate,
determine a third error rate measure corresponding to transmission of one or more second data units by the first communication device to the second communication device according to the second trial set of communication parameter values, and
select the new communication parameter values based on the third error rate measure.

9. The apparatus of claim 8, wherein the one or more IC devices are further configured to: when the network interface device determines that the new transmission rate should be used, and when the first set of communication parameter values includes one of the respective one or more alternative second values corresponding to the one or more second parameters:
determine whether the second transmission data rate is greater than a current transmission data rate; wherein:
determining the second trial set of communication parameter values as
i) the respective plurality of first values corresponding to the second row of the master rate table, and
ii) the respective one or more default second values corresponding to the second row of the master rate table is performed when the network interface device determines that the second transmission data rate that is greater than the current transmission data rate,
determining the third error rate measure is performed when the network interface device determines that the second transmission data rate that is greater than the current transmission data rate, and
selecting the new communication parameter values based on the third error rate measure is performed when the network interface device determines that the second transmission data rate that is greater than the current transmission data rate.

10. The apparatus of claim 9, wherein the one or more IC devices are further configured to: when the network interface device determines that the new transmission rate should be used, when the first set of communication parameter values includes one of the respective one or more alternative second values corresponding to the one or more second parameters, and when the network interface device determines that the second transmission data rate is not greater than the current transmission data rate:
   determine a third trial set of communication parameter values as
      i) the respective plurality of first values corresponding to the second row of the master rate table, and
      ii) at least one of the respective one or more alternative second values corresponding to
         i) the one or more second parameters, and
         ii) the second row of the master rate table,
   determine a fourth error rate measure corresponding to transmission of one or more fourth data units by the first communication device to the second communication device according to the third trial set of communication parameter values, and
   select the new communication parameter values based on the fourth error rate measure.

11. A method, comprising:
   generating, at a communication device, one or more first physical layer (PHY) data units using a first set of communication parameter values, wherein the first set of communication parameter values corresponds to a first data rate;
   transmitting, by the communication device, the one or more first PHY data units;
   determining, at the first communication device, that a new data rate is to be used based on error rate information corresponding to the transmission of the one or more first PHY data units; in response to determining that the new data rate is to be used:
   determining, at the communication device, a plurality of trial sets of communication parameters corresponding to respective second data rates,
   generating, at the communication device, respective sets of one or more second PHY data units using the plurality of trial sets of communication parameter values,
   transmitting, by the communication device, the respective sets of one or more second PHY data units during a first contiguous time period for evaluating the plurality of trial sets of communication parameter values, and
   selecting, at the communication device, a particular trial set of the plurality of trial sets that resulted in a best error rate performance corresponding to the transmission of the respective sets of one or more second PHY data units during the first contiguous time period;
   wherein the method further comprises
   transmitting, by the communication device, one or more third PHY data units using the new set of communication parameter values during a second contiguous time period after the first contiguous time period.

12. The method of claim 11, wherein: the respective sets of one or more second PHY data units includes
   i) a first set of one or more second PHY data units generated using a first trial set of communication parameter values among the plurality of trial sets of communication parameters, and
   ii) a second set of one or more second PHY data units generated using a second trial set of communication parameter values among the plurality of trial sets of communication parameters;
   transmitting the respective sets of one or more second PHY data units during the first contiguous time period comprises:
   transmitting, by the communication device, the first set of one or more second PHY data units during a first contiguous time subperiod, and
   transmitting, by the communication device, the second set of one or more second PHY data units during a second contiguous time subperiod.

13. The method of claim 12, further comprising:
   generating, at the communication device, one or more fourth PHY data units using the first set of communication parameter values; and
   transmitting, by the communication device, the one or more fourth PHY data units during a third contiguous time subperiod between the first contiguous time subperiod and the second contiguous time subperiod.

14. The method of claim 11, further comprising:
   using, by the communication device, the new set of communication parameter values for PHY data units at least for a minimum time duration.

15. The method of claim 11, wherein selecting the new set of communication parameter values comprises:
   selecting the first set of communication parameter values as the new set of communication parameter values in response to determining that none of the plurality of trial sets of communication parameter values provides an acceptable error rate.

16. An apparatus, comprising:
   a network interface device including one or more integrated circuit (IC) devices, wherein the one or more IC devices are configured to:
   generate one or more first physical layer (PHY) data units using a first set of communication parameter values, wherein the first set of communication parameter values corresponds to a first data rate,
   transmit the one or more first PHY data units,
   determine that a new data rate is to be used based on error rate information corresponding to the transmission of the one or more first PHY data units, and in response to determining that the new data rate is to be used:
   determine a plurality of trial sets of communication parameters corresponding to respective second data rates,
   generate respective sets of one or more second PHY data units using the plurality of trial sets of communication parameter values,
   transmit the respective sets of one or more second PHY data units during a first contiguous time period for evaluating the plurality of trial sets of communication parameter values, and
   select a particular trial set of the plurality of trial sets that resulted in a best error rate performance corresponding to the transmission of the respective sets of one or more second PHY data units during the first contiguous time period, and wherein the one or more IC devices are configured to:
   transmit one or more third PHY data units using the new set of communication parameter values during a second contiguous time period after the first contiguous time period.

17. The apparatus of claim 16, wherein: the respective sets of one or more second PHY data units includes
   i) a first set of one or more second PHY data units generated using a first trial set of communication parameter values among the plurality of trial sets of communication parameters, and
   ii) a second set of one or more second PHY data units generated using a second trial set of communication parameter values among the plurality of trial sets of communication parameters;

wherein the one or more IC devices are configured to:
> transmit the first set of one or more second PHY data units during a first contiguous time subperiod within the first contiguous time period, and
>
> transmit the second set of one or more second PHY data units during a second contiguous time subperiod within the first contiguous time period.

18. The apparatus of claim 17, wherein the one or more IC devices are configured to:
> generate one or more fourth PHY data units using the first set of communication parameter values; and
>
> transmit the one or more fourth PHY data units during a third contiguous time subperiod between the first contiguous time subperiod and the second contiguous time subperiod.

19. The apparatus of claim 16, wherein the one or more IC devices are configured to:
> use the new set of communication parameter values for PHY data units transmitted during the second contiguous time period at least for a minimum time duration.

20. The apparatus of claim 16, wherein the one or more IC devices are configured to:
> select the first set of communication parameter values as the new set of communication parameter values in response to determining that none of the plurality of trial sets of communication parameter values provides an acceptable error rate.

\* \* \* \* \*